US006665776B2

(12) United States Patent
Jouppi et al.

(10) Patent No.: US 6,665,776 B2
(45) Date of Patent: Dec. 16, 2003

(54) APPARATUS AND METHOD FOR SPECULATIVE PREFETCHING AFTER DATA CACHE MISSES

(75) Inventors: Norman Paul Jouppi, Palo Alto, CA (US); Keith Istvan Farkas, San Carlos, CA (US)

(73) Assignee: Hewlett-Packard Development Company L.P., Houston, TX (US)

(*) Notice: Subject to any disclaimer, the term of this patent is extended or adjusted under 35 U.S.C. 154(b) by 242 days.

(21) Appl. No.: 09/755,719

(22) Filed: Jan. 4, 2001

(65) Prior Publication Data

US 2002/0087794 A1 Jul. 4, 2002

(51) Int. Cl.[7] ............................................... G06F 12/00
(52) U.S. Cl. ....................................... 711/137; 712/207
(58) Field of Search ............................... 711/137, 119, 711/120, 124, 128, 140; 712/207

(56) References Cited

U.S. PATENT DOCUMENTS 6,085,291 A * 7/2000 Hicks et al. ................ 711/137
6,317,810 B1 * 11/2001 Lopez-Aguado et al. ... 711/120
6,317,820 B1 * 11/2001 Shiell .......................... 712/32
6,381,678 B2 * 4/2002 Fu et al. ..................... 711/137
6,490,658 B1 * 12/2002 Ahmed et al. .............. 711/140

OTHER PUBLICATIONS

Jegou et al., ACM—Speculative Prefetching, 1993, pp. 59–62.*
Hennessy and Patterson, Computer Organization and Design, Dec. 1998, Morgan Kaufman Publishers, 2$^{nd}$ edition, p. 541.*
Mano, Computer Engineering: Hardware Design, Dec. 1988, Prentice–Hall, pp., 152–153 and 187–193.*
Handy, The Cache Memory Book, 12, 1998, Academic Press, 2$^{nd}$ edition, p. 51 and 54.*

* cited by examiner

Primary Examiner—Kimberly McLean-Mayo

(57) ABSTRACT

A microprocessor is configured to continue execution in a special Speculative Prefetching After Data Cache Miss (SPAM) mode after a data cache miss is encountered. The microprocessor includes additional registers and program counter, and optionally additional cache memory for use during the special SPAM mode. By continuing execution during the SPAM mode, multiple outstanding and overlapping cache fill requests may be issued, thus improving performance of the microprocessor.

14 Claims, 17 Drawing Sheets

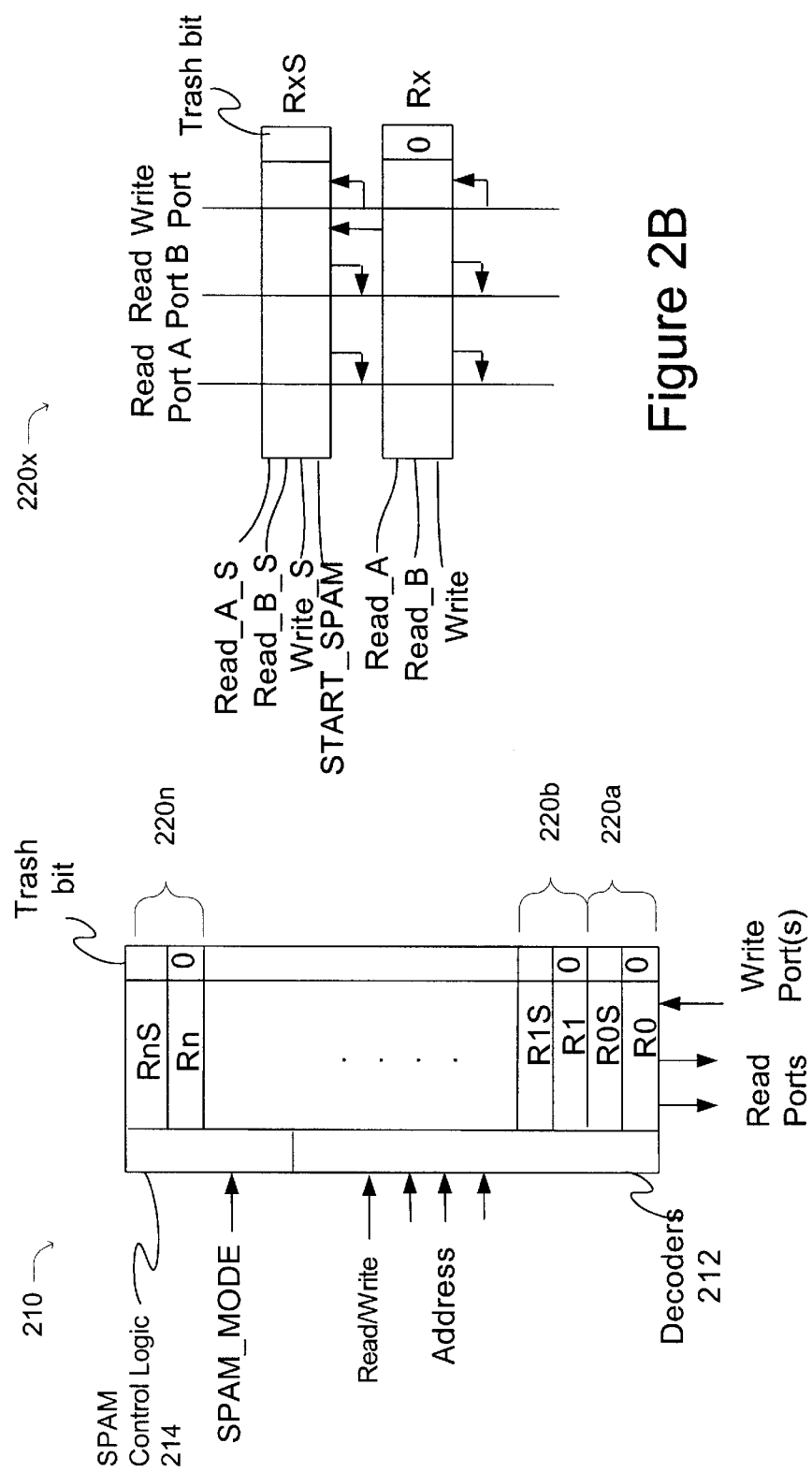

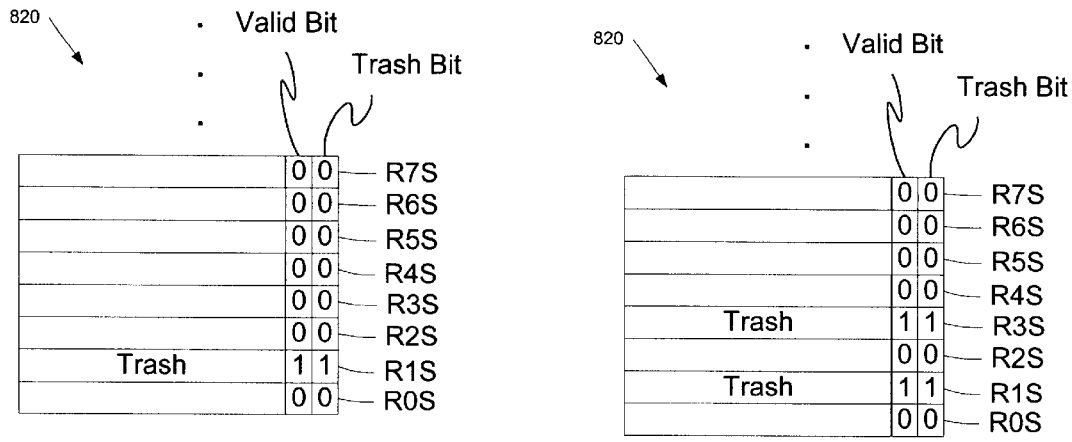
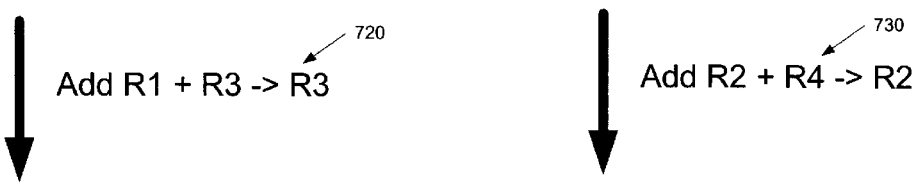
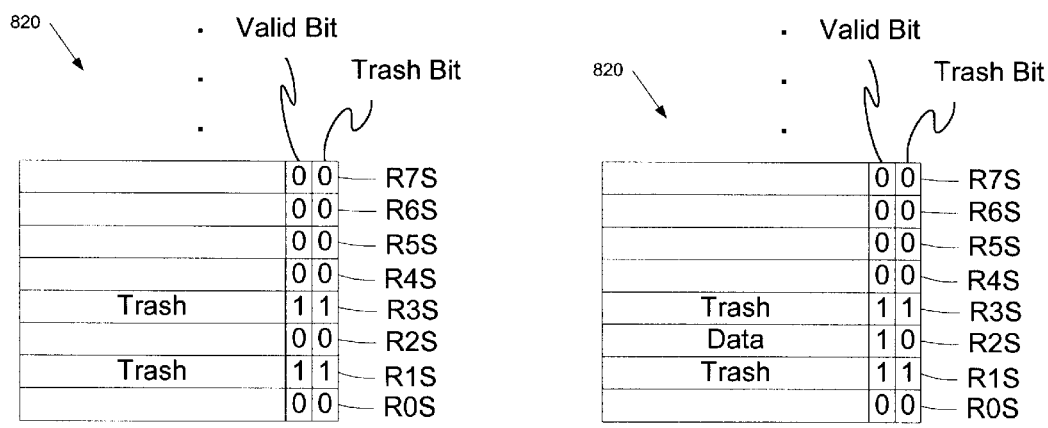
Figure 9A          Figure 9B

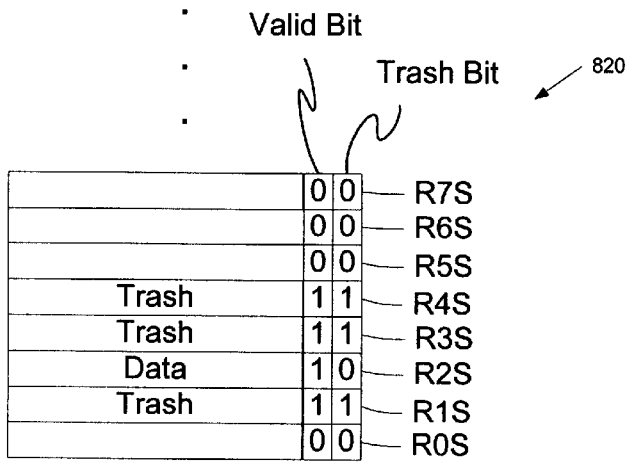
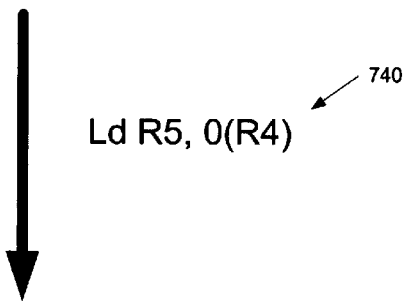
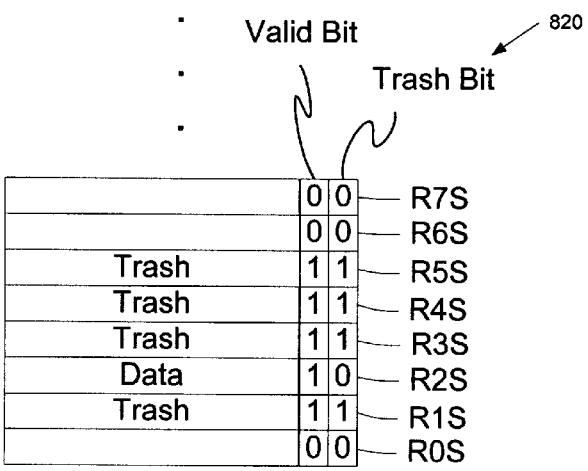
Figure 11

APPARATUS AND METHOD FOR SPECULATIVE PREFETCHING AFTER DATA CACHE MISSES

FIELD OF THE INVENTION

The present invention relates generally to the field of microprocessor micro architecture.

BACKGROUND OF THE INVENTION

Before the invention of caches, several machines implemented forms of dynamic scheduling in order to avoid stalling when a cache miss was encountered. The two most notable examples were the CDC 6600 with its scoreboard and the IBM 360/91 with its Tomasulo Algorithm, which were introduced in the late 1960's. Dynamic scheduling, which entails rearranging the order of instructions in hardware during execution of the program while maintaining the semantics of the original program order, was found to be extremely complex, expensive, hard to debug, and hard to test. Therefore, during the 1970's and 1980's, no other dynamically scheduled machines were produced at IBM. Similarly, dynamic scheduling was also abandoned at CDC. Furthermore, dynamically scheduled processors were not produced by other manufacturers during that period.

Shortly after the introduction of the CDC 6600 and the IBM 360/91, computer systems using cache memory were developed. In those systems, as in modern computers, most memory accesses by a processor are satisfied by data in cache memory. Since the cache can be accessed much more quickly than main memory, the need for dynamic scheduling was also reduced.

In recent years, processor cycle times have decreased greatly, and the capacity of memory chips has increased significantly. But the access time of memory chips has changed little. This has led to an increasing gap between cache access times and main memory access times.

For example, in the late 1970's, a VAX 11-780 would only slow down 50% if its cache was turned off and if it executed out of main memory. Today, main memory access times can be more than 100 cycles, and programs could slow down by more than 100 times if they fetched each instruction and data reference from main memory instead of cache. Even when an instruction or data reference is occasionally accessed from main memory, the small amount of cache misses can still greatly slow down program execution because of the long memory access times.

In order to reduce processor stalling when a cache miss is encountered, some microprocessor manufacturers have reintroduced dynamically scheduling in their processors in recent years. A dynamically scheduled processor will try to find other instructions that do not depend on the data being fetched from the missing load, and execute these other instructions out-of-order and in parallel with the cache miss. Significantly higher performance can thus be obtained.

Dynamically scheduled microarchitectures, analogous to the dynamically scheduled systems, are complex, have a large transistor count, a long design time, and long verification cycles. Therefore, there exists a need for a microarchitecture that reduces processor stalling when a cache miss is encountered, and that does not resort to a high complexity design.

SUMMARY OF THE DISCLOSURE

An embodiment of the present invention is a processor that does not require the complexity of a dynamically scheduled microarchitecture, but is capable of achieving improved performance relative to a conventional statically-scheduled processor. The processor does not stall upon a data cache miss. Rather, the processor continues execution in a special Speculative Prefetching After data cache Miss (SPAM) mode when a cache miss is encountered. In the SPAM mode, the processor prefetches data and instructions not yet present in cache. When the initiating data cache miss is filled, the processor resumes execution in a normal mode. Some of the instructions that launched prefetches during SPAM mode may be executed again in normal mode. In this way, the processor can avoid or reduce stalling caused by data cache misses.

An embodiment that is described and shown includes normal mode register for use during normal mode execution, and SPAM registers for use during SPAM execution. The processor may further include two program counters, one for use during normal mode execution and another for use during SPAM execution. The processor may also include a SPAM cache for holding data during SPAM execution.

During normal mode execution, register writes occur to the normal mode registers. When a data miss occurs, in one embodiment, the normal mode program counter (PC) and the normal mode registers are copied to the SPAM program counter (SPAM PC) and the SPAM registers. Execution of the program then continues using the SPAM PC until the fetch for the data cache miss returns. The normal PC and the normal mode registers remain unchanged throughout SPAM execution. When the fetch for the data cache miss returns, normal mode execution using the normal mode registers and normal mode PC resumes.

According to an embodiment, a register file containing pairs of normal registers and SPAM registers laid out adjacently to each other. The normal mode registers are used during normal mode operations and the SPAM registers are used during SPAM mode operations. Special circuits of the processor copy the contents of the normal mode registers into the corresponding SPAM registers on an initiating cache miss. Another embodiment that is described and shown includes normal mode registers and SPAM registers that are held in separate register files. In this embodiment, the normal mode registers are not copied to the SPAM registers immediately after a data cache miss. Rather, the SPAM registers are updated on an instruction-by-instruction basis.

BRIEF DESCRIPTION OF THE DRAWINGS

For a better understanding of the invention, reference should be made to the following detailed description taken in conjunction with the accompanying drawings, in which:

FIG. 2A illustrates a register file including normal mode registers and SPAM registers in furtherance of an embodiment of the present invention.

FIG. 2B illustrates a pair of normal mode register and a SPAM register of the register file of FIG. 2A.

FIG. 9A illustrates operations of a SPAM execution register file in response to an add instruction of FIG. 7.

FIG. 9B illustrates operations of a SPAM execution register file in response to another add instruction of FIG. 7.

FIG. 11 illustrates operations of a SPAM execution register file in response to yet another load instruction of FIG. 7.

DETAILED DESCRIPTION

A. Overview

The present invention provides an improved processor that continues program execution in a speculative mode after encountering a data cache miss, and a method of operating the same. During the speculative mode, the processor of the present invention may encounter additional data cache misses and may issue multiple concurrent cache fill requests. Since the latency of memory operations can dominate the performance of many applications on many systems, a higher performance can be obtained when cache fill requests overlap. According to an embodiment of the present invention, overlapping of cache fill requests can be achieved without resorting to a complex dynamically scheduled microarchitecture. Rather, overlapping of cache fill requests can be achieved by using a relatively simple in-order processor core of the present invention.

Figure 1:
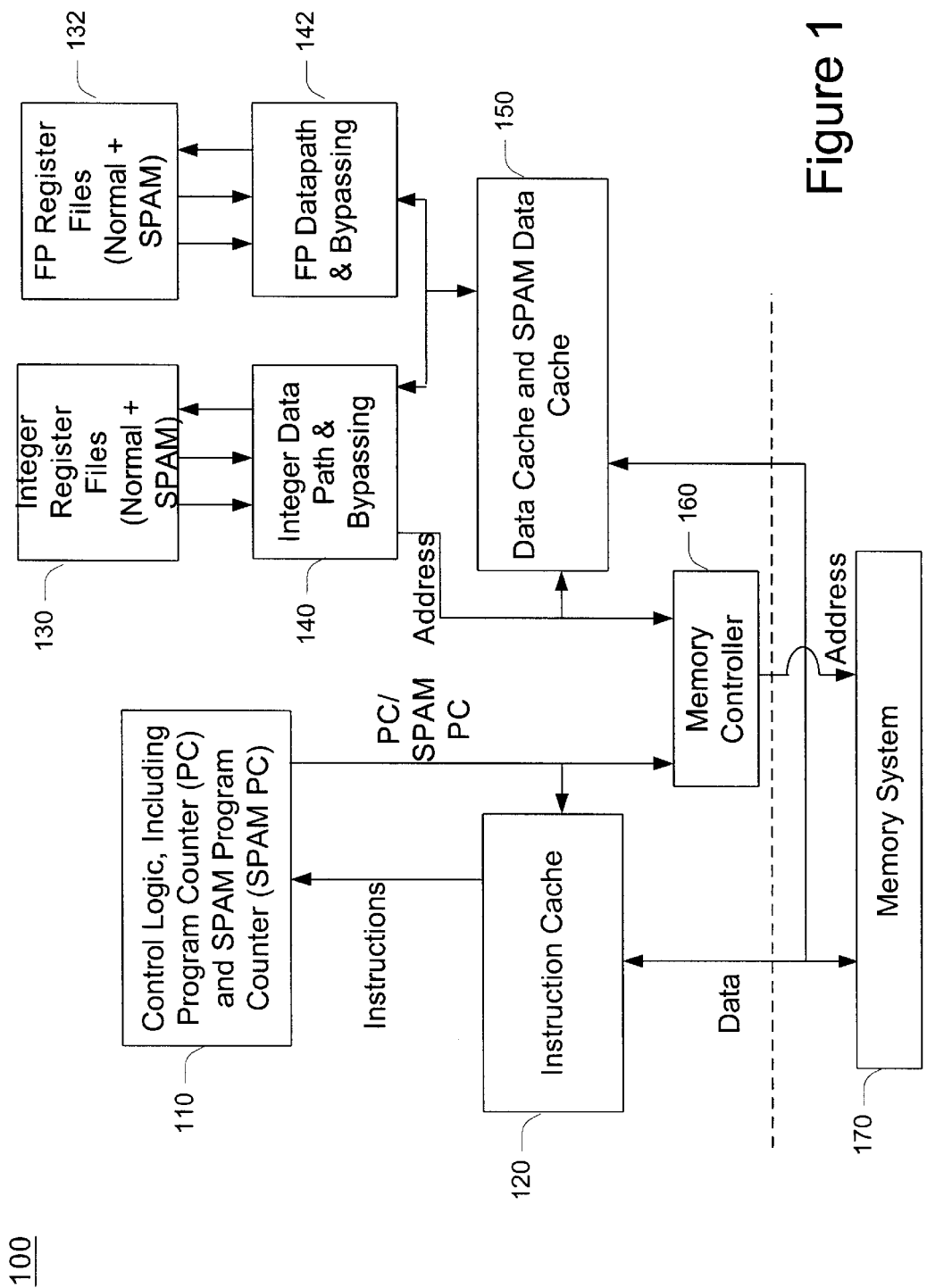
FIG. 1 is a block diagram illustrating components of a processor according to one embodiment of the present invention.

FIG. 1 is a block diagram illustrating components of a processor 100 according to one embodiment of the present invention. Particularly, the processor 100 includes control logic 110, an instruction cache 120, integer register files 130, floating point register files 132, integer data path and bypassing circuitry 140, floating point datapath and bypassing circuitry 142, a cache unit 150, and a memory controller 160. The control logic 110 is responsible for fetching instructions from instruction cache 120 and/or a memory system 170 via memory controller 160. The memory system 170 is typically not part of the processor 100. In addition, the control logic 110 generates control signals for controlling the components (e.g., integer register files 130, floating point register files 132, integer data path and bypassing circuitry 140, floating point datapath and bypassing circuitry 142, cache memory unit 150, and memory controller 160) of the processor 100. The instruction cache 120 holds instructions that are prefetched from memory system 170 for execution by the processor 100. Register files 130 and 132 include registers used during program execution. Datapath and bypassing circuits 140 and 142 include arithmetic logic units (ALUs) for performing arithmetic and logic operations on data contained in the register files 130 and 132. Datapath and bypassing circuits 140 and 142 also include data busses and circuitry for transferring data between register files 130 and 132 and the cache memory unit 150 under control of control logic 110.

The processor 100 of the present embodiment has two program execution modes: a normal mode and a speculative data prefetching mode. In the normal mode, program execution is performed using a normal mode program counter (PC) of the control logic 110. During normal mode execution, normal mode registers located within integer register files 130 and floating point register files 132, and normal mode cache memory of the cache memory unit 150 are used.

When a data cache miss is encountered, a conventional in-order processor may stall (i.e., stop program execution) and wait for the missing data to be fetched from the main memory. A conventional statically-scheduled processor that employs a lock-up free data cache and non-blocking loads may not stall. Such a processor may continue to issue instructions until one of two events occurs: (1) the next-to-issue instruction uses the result of a data cache miss that has yet to be resolved as an input, or (2) the just-issued instruction itself encounters a cache miss and there are insufficient resources to allow execution to continue.

Unlike conventional in-order processors, the processor 100 continues execution in a special speculative prefetching (SPAM) mode after a data cache miss is encountered. Further, unlike conventional statically-scheduled processors that use lock-up free data cache and non-blocking loads, the processor 100 does not stall even when the next-to-issue instruction uses the result of a data cache miss. Thus, the processor 100 provides a performance benefit beyond that provided by a processor that merely has a lockup-free cache and non-blocking loads.

When a data cache miss occurs, the processor 100 continues program execution until the initiating data cache miss is returned, using special SPAM mode hardware (e.g., a special SPAM program counter (SPAM PC), special SPAM mode registers (or, SPAM registers) located within the integer register files 130 and the floating point register files 132 and a special SPAM cache memory of the cache memory unit 150). The normal PC and the normal mode registers remain unchanged during SPAM execution. If additional data cache misses occur during the SPAM mode, additional cache fill requests will be issued to the memory system via memory controller 160. After the initiating data cache miss is returned, normal mode execution resumes, and instructions are executed using the normal mode PC and the normal mode registers. The results of the SPAM execution (e.g., SPAM PC, data stored within the SPAM registers and the SPAM cache) are ignored during normal mode execution. Additional cache fill requests that may have been issued to the memory system, however, are carried out by the memory system. These additional cache fill requests may be considered as "speculative data prefetches" because such requests fetch data that may or may not be used when normal mode execution resumes.

According to one embodiment of the invention, instruction cache misses that occur during SPAM mode may initiate a prefetch of the missing instruction cache line. Prefetching an instruction cache line may result in an overlap between the instruction and data cache misses. Execution in SPAM mode may be stalled after an instruction cache miss. If the instruction cache miss is resolved before the initiating data cache miss is resolved, SPAM mode execution may continue.

Cache fill requests that are issued during SPAM mode return after processing by the memory system 170. Prefetches are written into the data cache unit 150 or instruction cache unit 120, depending on their type. By the time the prefetches return, normal mode execution may have already resumed. Further, the instructions that launched the prefetches during SPAM mode may be about to be executed again by the time the prefetches return. In this way, stalling of the processor 100 due to cache misses may be significantly reduced.

B. Register Files Architecture

As mentioned, the processor 100 includes SPAM registers for use during SPAM mode. In the present embodiment, the SPAM registers may be found in the integer register files 130 and the floating point register files 132. In one implementation, the register files 130 and/or 132 may include register-pairs laid out adjacent to each other, and special circuits for copying the normal mode registers into corresponding SPAM registers on an initiating cache miss. FIG. 2A illustrates a register file 210 in accordance with this implementation, and FIG. 2B illustrates a register pair 220x of the register file 210. As shown in FIG. 2A, register file 210 includes register pairs 220a–220n, decoder logic 212, and SPAM control logic 214. Each of the register pairs 220a–220n includes a normal mode register (e.g., R0, R1, Rn, etc.) and a SPAM register (e.g., R0S, R1S, RnS, etc.). Each normal mode register includes a trash bit that is hard-wired to "0," and each SPAM register includes a trash bit for indicating whether the register contains arbitrary data.

The decoder logic 212 receives addresses and control signals from control logic 110, and determines specific registers of the register file 210 to be read from or written to. The SPAM control logic 214 is for duplicating the contents of the normal mode registers of the register pairs 220a–220n to the SPAM registers upon entering SPAM mode. In addition, the SPAM control logic 214 may clear the trash bit of the SPAM registers upon entering SPAM mode. Note that, in the present embodiment, register duplication is performed in parallel. That is, all the registers are copied to the SPAM registers in parallel such that significant delay can be avoided. FIG. 2B illustrates a register pair 220x of the register file 210. Register pair 220x includes a normal mode register Rx and a SPAM register RxS each configured for access using two ports. Normal mode register Rx is controlled by control signals Read_A, Read_B and Write. SPAM register RxS is controlled by control signals Read_A_S, Read_B_S, Write_S, and START_SPAM. In normal mode, register reads and writes are performed on the normal mode register Rx. When the processor 100 enters SPAM mode, the START_SPAM signal causes logic associated with the SPAM register RxS to copy the normal mode register Rx, and to clear the trash bit of the SPAM register RxS. After the normal mode register Rx is copied to the SPAM register RxS, program execution can be continued using the SPAM register RxS.

Figure 3A:
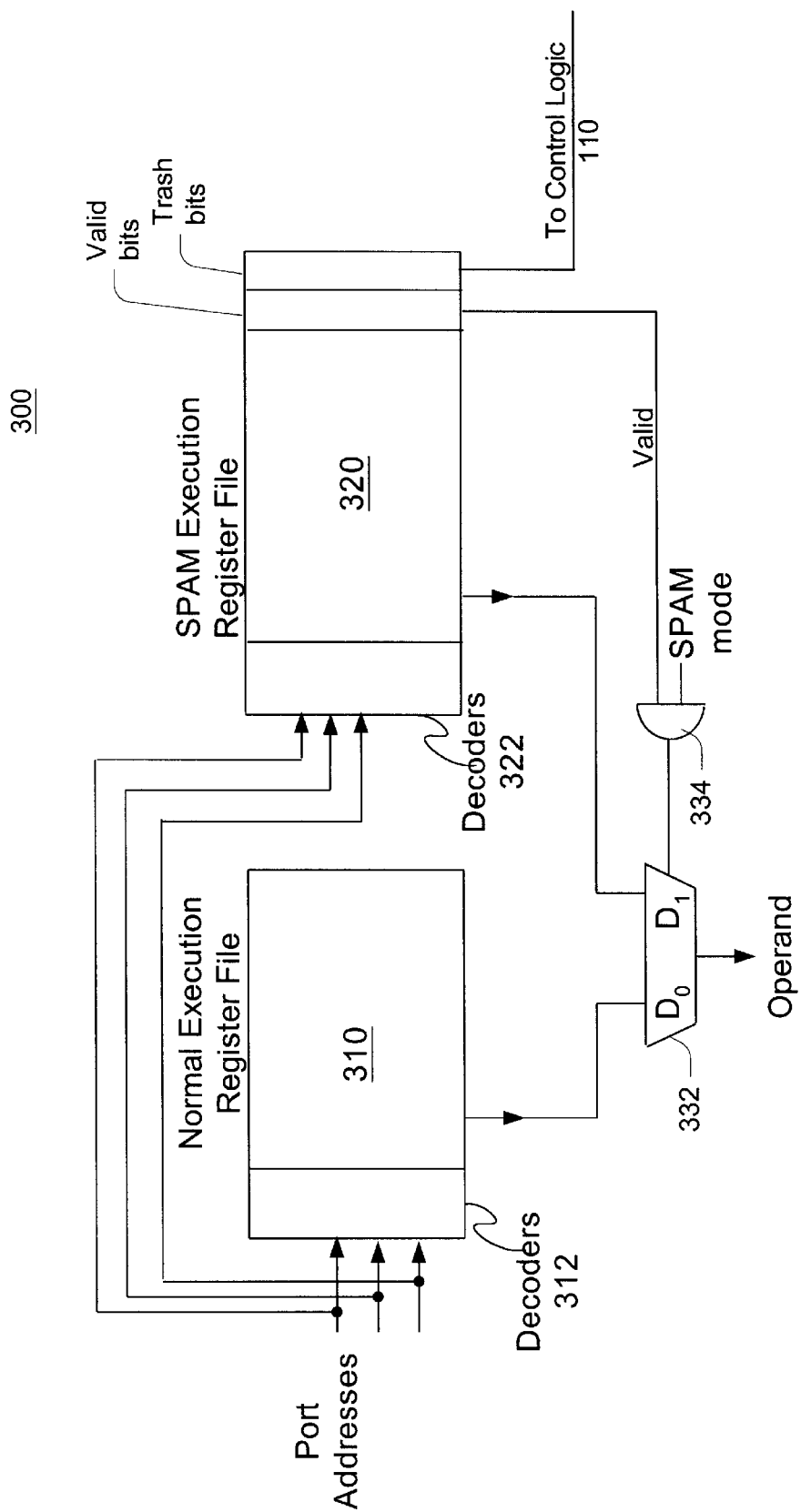
FIG. 3A is a block diagram illustrating separate register files for normal mode registers and SPAM registers in accordance with another embodiment of the invention.

FIG. 3A is a block diagram illustrating an implementation of a register file 300 in accordance with another embodiment of the present invention. As shown in FIG. 3A, normal mode registers and SPAM registers are located in separate register files 310 and 320, respectively. Normal execution register file 310 and SPAM execution register file 320 also include address decoders 312 and 322, respectively, for receiving addresses from control logic 110. Also illustrated in FIG. 3A are multiplexer 332 and AND-gate 334, which are configured for selectively providing operands from the Normal execution register file 310 or from the SPAM execution register file 320 in response to addresses and control signals generated by control logic 110.

According to the present embodiment, each register in the SPAM execution register file 320 includes a trash bit and a valid bit. The trash bit indicates whether an associated register contains arbitrary data, and the valid bit indicates whether the associated register is in use during SPAM mode. In one embodiment, if the trash bit of a SPAM register is set, it denotes that the SPAM register contains arbitrary data. If the valid bit is set, it indicates that the SPAM register (e.g., RxS) should be used in preference over a corresponding normal mode register (e.g., Rx). If the valid bit is not set, it indicates that the corresponding register (e.g., Rx) in the normal execution register file 310 should be used.

In operation, during normal mode program execution, a SPAM_MODE control signal, which may be provided by control logic 110, is not set (e.g., at logic "0"). Thus, the output of the AND-gate 334 will be at logic "0," causing the output from the normal execution register file 310 to be selected by multiplexer 332. During SPAM mode program execution, however, the SPAM_MODE control signal is set, causing the output of the SPAM execution register file 320 to be selected by multiplexer 332 if the SPAM register being addressed has its valid bit set. Therefore, in SPAM execution mode, data stored in the SPAM execution register file 320 will be read if the corresponding valid bit is set, and data stored in the normal execution register file 310 will be read if the corresponding valid bit is not set. In this way, it is not necessary to copy the contents of the normal mode registers to the SPAM registers upon entering SPAM mode.

With reference still to FIG. 3A, when data is written to the SPAM execution register file 320 during SPAM mode, the valid bit corresponding to the appropriate SPAM register is set. The trash bit of that SPAM register, however, is not set unless the data depends on the data cache miss. Mechanisms for setting and clearing the trash bits of the SPAM registers are discussed in more detail below.

Figure 3B:
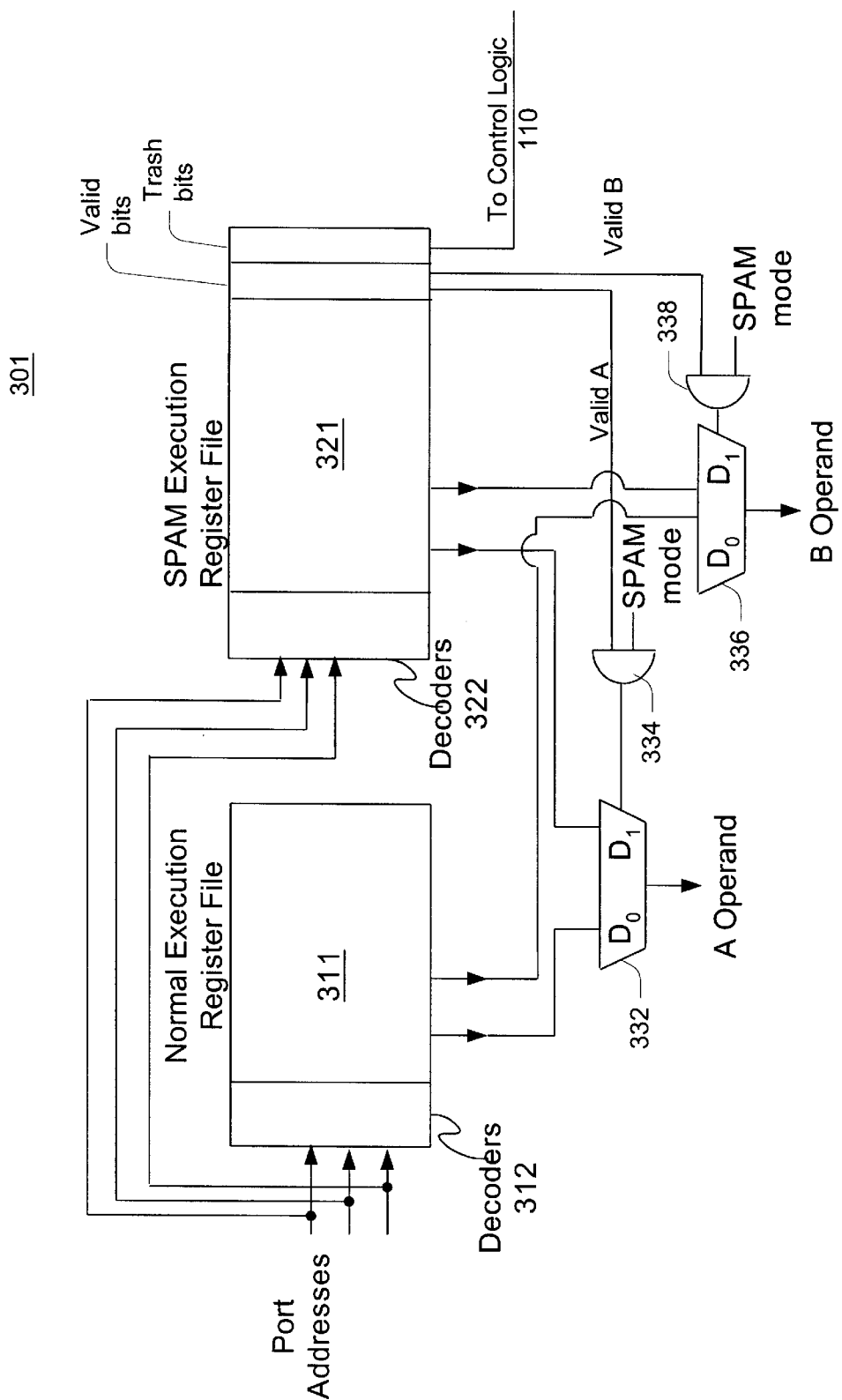
FIG. 3B is a block diagram illustrating separate register files for normal mode registers and SPAM registers in accordance with yet another embodiment of the invention.

FIG. 3B is a block diagram illustrating a register file 301 in accordance with yet another embodiment of the present invention. As shown in FIG. 3B, registers of both the normal execution register file 311 and SPAM execution register file 321 are configured for access using two ports. Thus, each register of the SPAM execution register file 320 is associated with two valid bits Valid A and Valid B, and two trash bits Trash A and Trash B. Additionally, normal execution register file 311 and SPAM execution register file 321 include address decoders 312 and 322, respectively, coupled to an address bus for receiving addresses from control logic 110. Also illustrated in FIG. 3B are multiplexers 332 and 336, and AND-gates 334 and 338, which are configured for selectively providing operands from the normal execution register file 311 and/or the SPAM execution register file 321 in response to addresses and control signals generated by the control logic 110.

During normal mode program execution, the SPAM_MODE control signal is not set, causing the outputs of the AND-gates 334 and 338 to be at logic "0," and causing the output from the normal execution register file 310 to be selected by multiplexer 332. During SPAM mode program execution, however, the SPAM_MODE control signal is at logic "1," causing the outputs of the SPAM registers having their valid bits set to be selected by multiplexer 332. Note that, during SPAM mode, operand A may be read from normal execution register file 310 and operand B may be read from SPAM execution register file 320, and vice versa.

C. SPAM Cache

According to an embodiment of the present invention, in order to avoid corrupting the data stored in the normal mode data cache and in the external memory, processor 100 treats store instructions as idle operations or no-ops. This approach, however, may cause the speculative execution to depart substantially from the actual execution, resulting in prefetches of useless data. For example, if a load instruction reads a cache location that would have been written by a suppressed store during SPAM mode, arbitrary data would be erroneously considered as accurate data.

Figure 4:
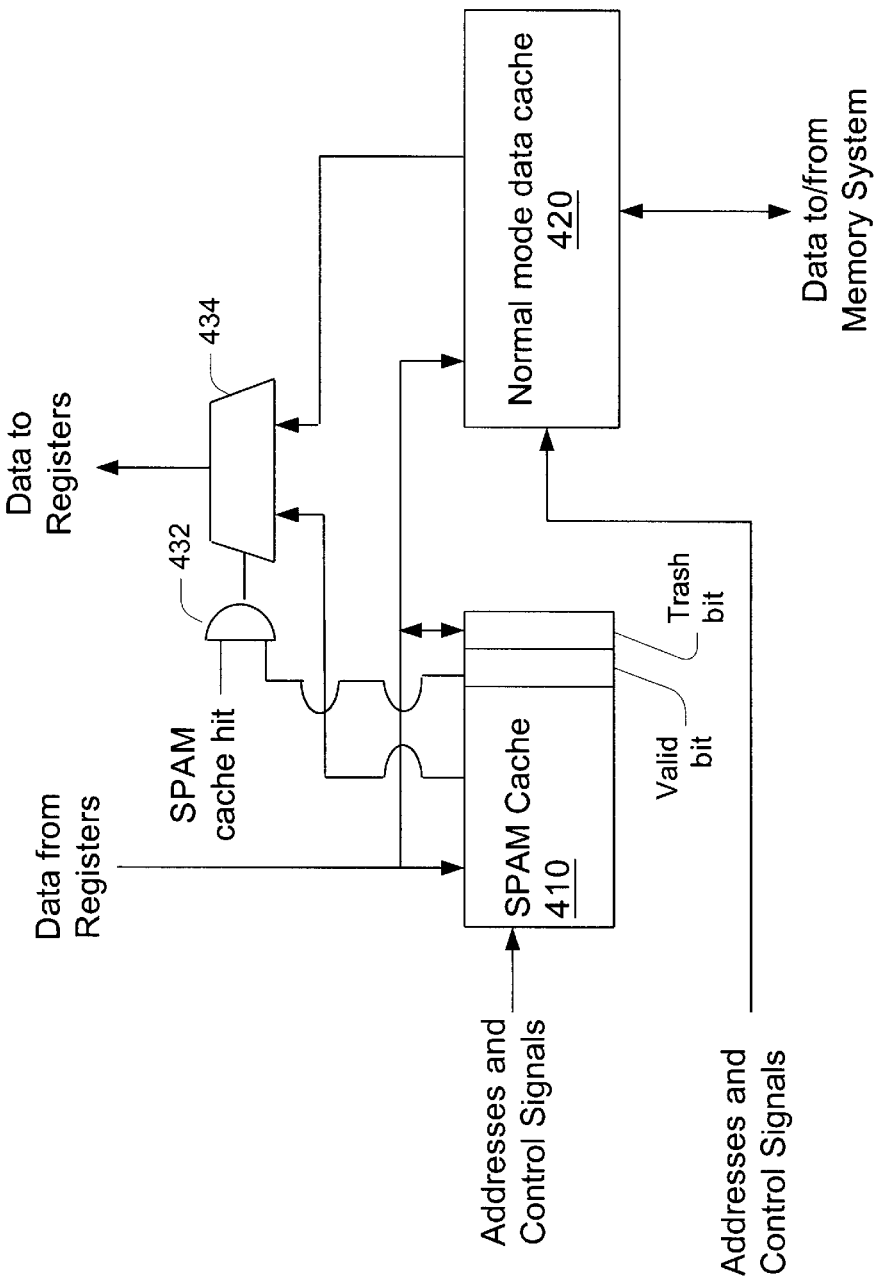
FIG. 4 is a block diagram of a data cache unit according to one embodiment of the present invention.

In accordance with another embodiment of the invention, a SPAM cache for use during SPAM mode for store instructions may be placed in parallel with the normal mode data cache. FIG. 4 illustrates an implementation of the data cache unit 150 including a normal mode data cache 420 and a SPAM cache 410 according to the present invention. As illustrated, SPAM cache 410 receives data from the register files 130 and 132, and receives control signals and addresses from control logic 110. Note that the entries of the SPAM cache 410 are associated with valid bits and trash bits. The valid bit indicates whether an associated entry is in use during SPAM mode, and the trash bit indicates whether the entry contains arbitrary data. Normal mode data cache 420 also receives data from the data bus 420 and control signals and addresses from control logic 110. Also illustrated in FIG. 4 are an AND-gate 432 and a multiplexer 434, configured for selecting the SPAM cache output or the normal mode data cache output.

In operation, on an initiating data cache miss, the SPAM cache 410 is cleared. When a store instruction whose base address is not arbitrary is executed in SPAM mode, data is written to the SPAM cache 410. Store instructions whose base addresses are arbitrary are treated as no-ops in SPAM mode. Further, when a load instruction is executed in SPAM mode, the SPAM cache 410 and the normal mode data cache 420 are both checked. If the SPAM cache 410 has a cache hit, its data is used in preference to the data from the normal mode data cache 420.

D. Speculative Prefetching After Data Cache Miss Mechanisms

Figure 5:
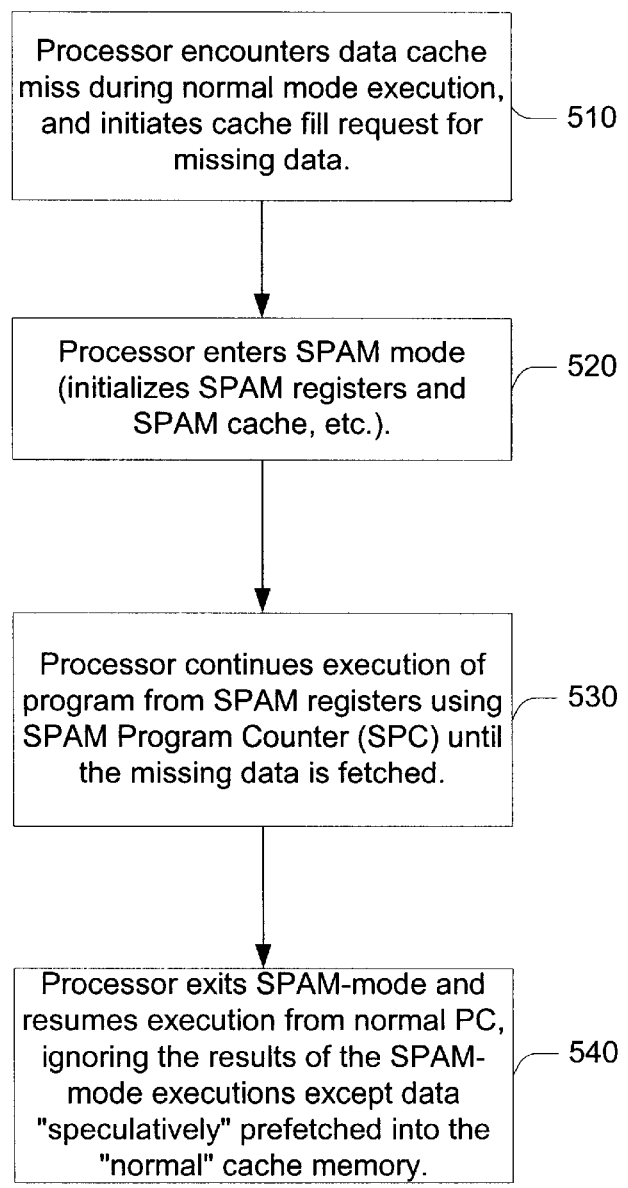
FIG. 5 is a flow chart diagram illustrating a process of executing instructions in a processor in accordance with an embodiment of the present invention.

FIG. 5 is a flow chart diagram illustrating the speculative prefetching after data cache miss process 500 in accordance with an embodiment of the present invention. The process 500 is performed by a processor operable in a normal mode and a SPAM mode, such as processor 100. The processor preferably has normal mode registers for use during the normal mode, and SPAM registers for use during the SPAM mode.

At step 510, a data cache miss is encountered during normal mode execution. In response to the data cache miss, the processor initiates a cache fill request to fetch the missing data from an external memory. In one embodiment, the external memory may be another on-die memory unit, an off-chip cache memory unit, the main memory of a computer system, or other type of storage media.

At step 520, after the data cache miss is encountered, the processor enters a SPAM mode by copying the normal mode PC to a SPAM PC and by initializing the SPAM registers (e.g., SPAM registers of register file 210 or SPAM execution register file 320). A SPAM cache (e.g., SPAM cache 420) may also be initialized by clearing its valid bits and trash bits at step 520.

At step 530, the processor enters SPAM mode and continues execution of the program from the SPAM registers using the SPAM PC until the missing data is fetched from memory. In SPAM mode, the SPAM registers and the SPAM cache are used, but not exclusively. Further, additional data cache misses may be encountered in SPAM mode, and additional cache fill requests are issued for fetching the missing data from memory. Data fetched from memory during SPAM mode may be stored in the normal mode data cache (e.g., data cache 420). It should be noted that the normal mode PC and the normal mode register files remain unchanged during SPAM mode execution, except for data fetched in response to normal mode cache misses.

With reference still to FIG. 5, at step 540, the processor resumes normal mode execution from the normal mode PC after the initiating data cache miss is returned. Since the normal mode PC remains unchanged during SPAM mode execution, normal mode execution can be resumed by restarting instruction fetch using the normal mode PC and disabling the SPAM-mode signal. According to the present embodiment, when normal mode execution is resumed, the results from the SPAM mode executions (e.g., data stored in SPAM registers and SPAM cache), except the additional cache fill requests that may have been issued, are ignored. The processor, however, continues to process the additional data cache fill requests that may have issued during SPAM mode.

Figure 6:
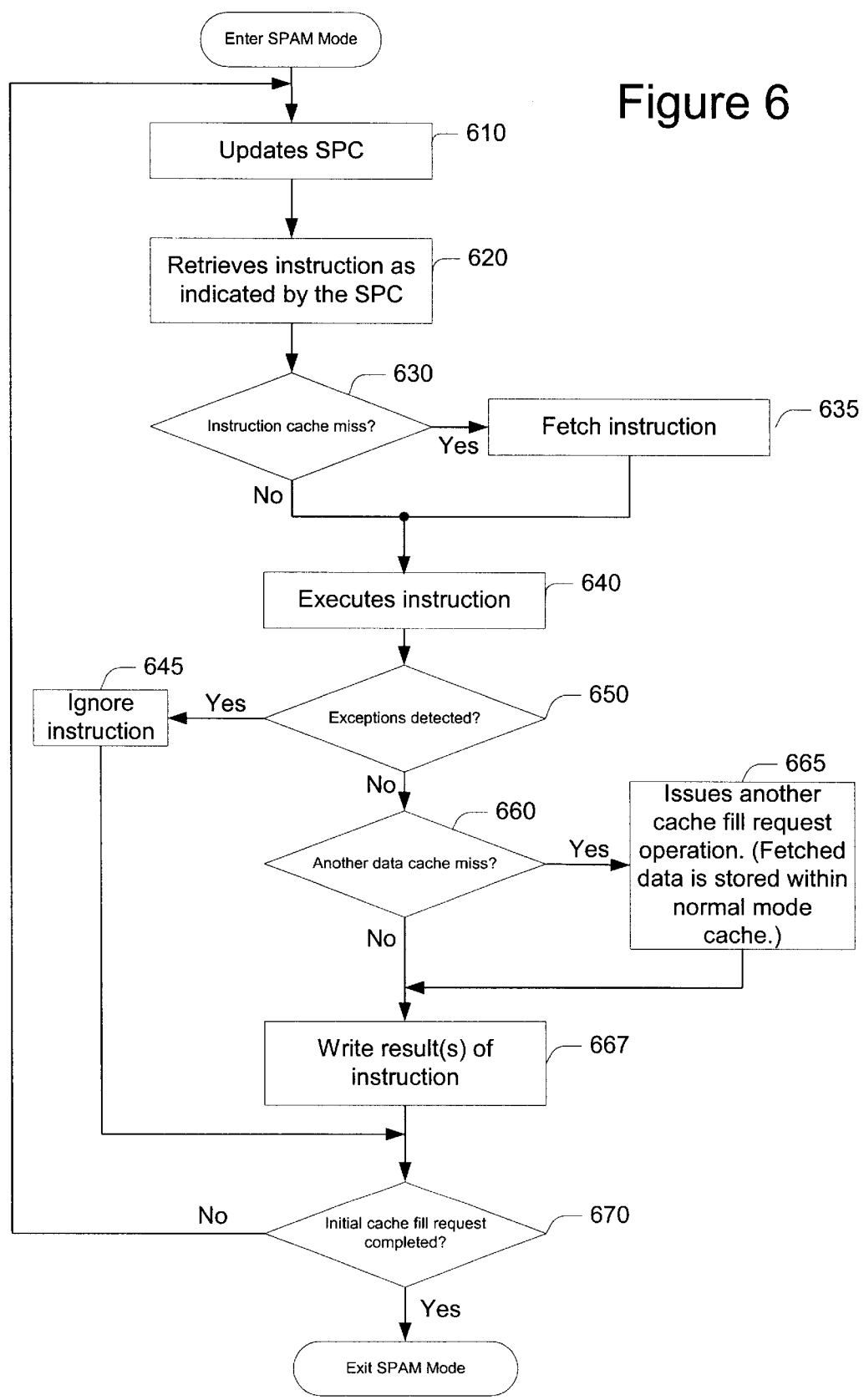
FIG. 6 is a flow chart diagram illustrating the operations of a processor during SPAM mode in accordance with an embodiment of the present invention.

FIG. 6 is a flow chart diagram illustrating the operations of a processor during SPAM mode in accordance with an embodiment of the present invention. As shown, at step 610, the SPAM PC is updated upon entering SPAM mode. In the present embodiment, the value at the normal mode PC may be copied to the SPAM PC, and the value of the SPAM PC may be incremented.

At step 620, the processor fetches the instruction indicated by the SPAM PC. At step 630, it is determined whether a instruction cache miss has occurred. If so, the missing instruction is fetched from the memory at step 635. Essentially, execution in SPAM mode is stalled until the instruction cache miss is resolved. If the instruction cache miss is resolved before the initiating data cache miss is resolved, SPAM execution may continue. Otherwise, if the initiating data cache miss is resolved before the resolution of the instruction cache miss, the processor exits the SPAM mode and resumes normal mode execution.

At step 640, the instruction is executed. At step 650, it is determined whether the instruction's execution causes an exception. At step 645, if it is determined that the instruction causes an exception, the instruction is treated as an idle instruction, or no-op. Input and output (I/O) operations are also treated as no-ops. The execution of the idle or no-op instruction does not change the state of the processor.

If it is determined that the instruction does not cause an exception, then at step 660, it is determined whether the instruction causes another data cache miss. If so, at step 665, another data cache fill request is issued. The newly issued cache fill request thus overlaps the initiating cache fill request.

Note that the instruction is executed even though the data required by the instruction may depend on the data cache miss. In the present embodiment, arbitrary data is used when an execution depends on missing data. Unconditional branches and branches that are conditional on registers without their trash bit set may be executed normally in SPAM mode. Branches that are conditional on registers with their trash bit set, in one embodiment, cause the processor to exit SPAM mode and stall. In another embodiment, the processor may continue execution down dynamically or statically predicted branches.

According to another embodiment of the present invention, branch predictor state for branches that are not dependent on trash operands may be updated after the instruction is executed. Updating the branch predictor state for branches that are not dependent on trash operands may have the advantage of pre-setting the branch predictors to the required state for execution beyond the initiating data cache miss. Updating the branch predictor state, however, may make the branch predictor state upon return to normal execution inconsistent with that at the time of the initiating data cache miss. Branches that are dependent on trash operands should not update the branch predictor state.

With reference still to FIG. 6, at step 667, the result(s) of the instruction's execution are then written to the appropriate registers to update the states of the machine. At step 670, it is determined whether the initiating cache fill request has been completed. If the initiating data cache miss has not been resolved, steps 610–670 are repeated. It should be noted that, during SPAM mode execution, multiple overlapping cache fill requests may be outstanding as long as the memory system can handle such multiple concurrently outstanding cache fill requests.

If it is determined that the initiating data cache fill request has been completed, the SPAM mode execution ends. Thereafter, normal mode program execution resumes, using the normal mode PC and the normal mode registers, and ignoring the data stored within the SPAM registers and the SPAM cache.

Note that the SPAM execution process described in FIG. 6 is described for illustration purposes only. Hence, more complicated operations, such as pipelined operations and super-scalar operations, are not described herewith. Nonetheless, it should be appreciated that the present invention may be practiced with such operations with the addition of conventional techniques well known to those skilled in the art.

E. SPAM Operation Examples

Figure 7:
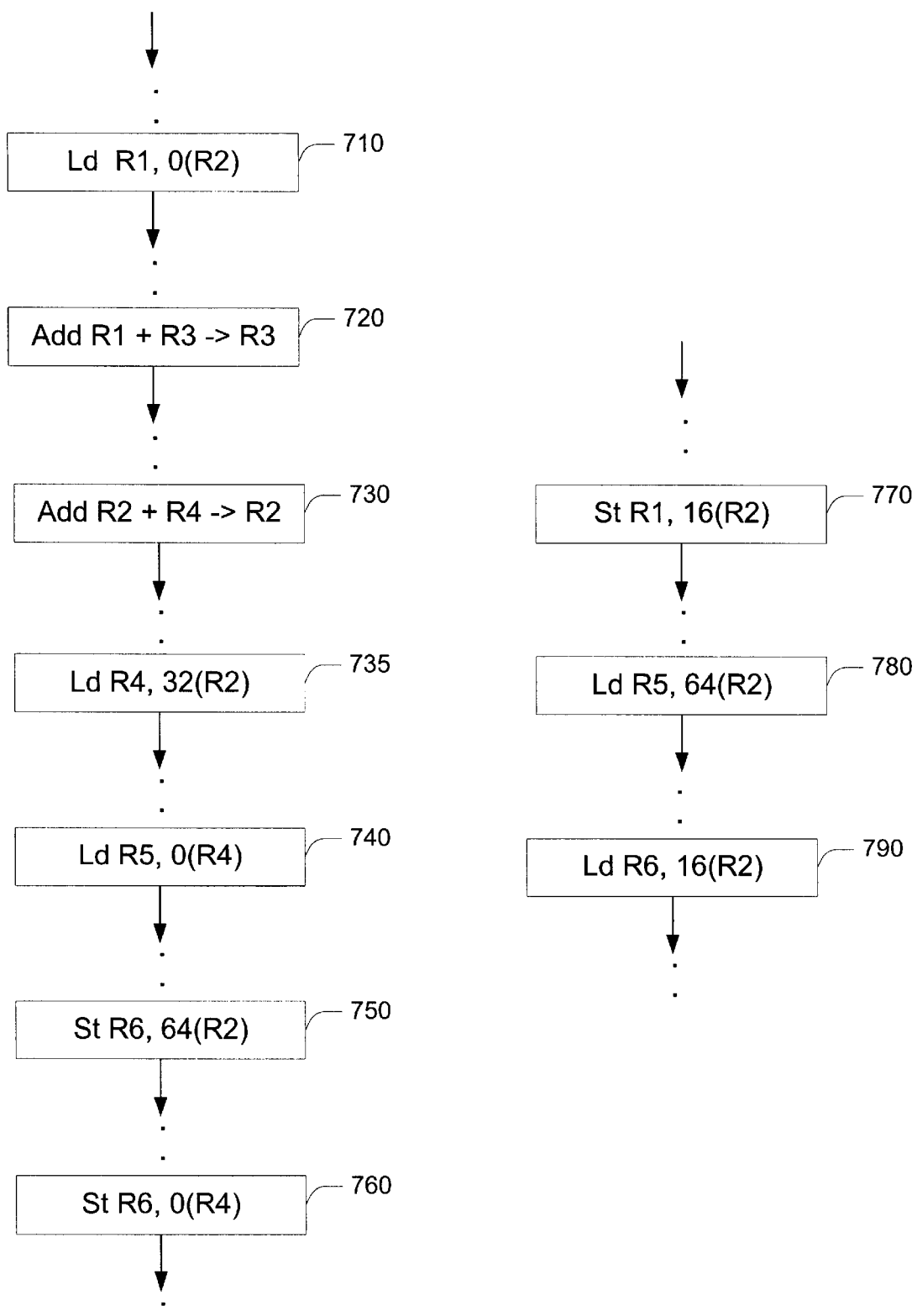
FIG. 7 is a program flow diagram illustrating exemplary instructions that may be executed by a processor according to an embodiment of the present invention.

FIG. 7 is a program flow diagram illustrating exemplary instructions 710–790 that may be executed by a processor, such as processor 100, having implemented therein a SPAM register file and a SPAM cache in furtherance of the present invention. The instructions 710–790 are for illustration purposes only, and in particular, for illustrating SPAM mode execution. Many other instructions that can be used to illustrate SPAM mode execution are not illustrated. Loads and stores of the exemplary instructions 710–790 implement a well known displacement addressing scheme. That is, an instruction "Ld RX, Y(RZ)" may cause the processor 100 to retrieve data from a memory location indicated by the sum of the content of a register RZ and the displacement "Y," and to store the retrieved data into another register RX. It should be appreciated that other addressing schemes and instruction syntaxes are equally applicable to the present invention.

The first instruction 710 illustrated in FIG. 7 is a load instruction "Ld R1, 0(R2)." Assuming that the load instruction 710 is executed during normal mode execution, if the memory location is cached, the cached data is then loaded into the register R1. Normal mode instruction execution will then continue with the next instruction. If the memory location is not cached, then a cache fill request is issued. According to the present invention, the processor 100 enters the SPAM instruction execution mode, and continues to execute the subsequent instructions (e.g., instructions 720–790) using the SPAM PC and the SPAM registers.

Figure 8:
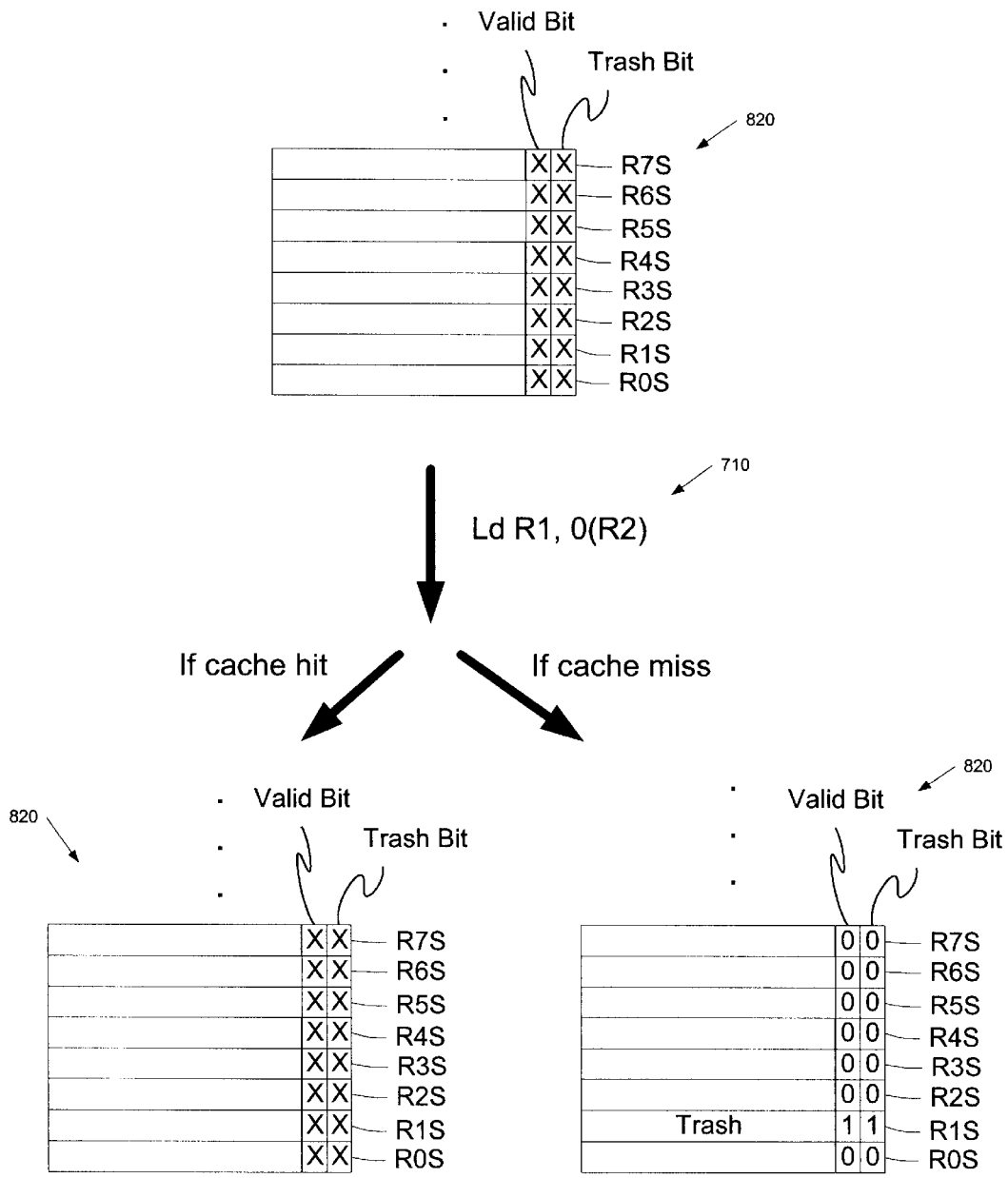
FIG. 8 illustrates operations of a SPAM execution register file in response to a load instruction of FIG. 7.

The operations of a SPAM execution register file 820 in response to the first instruction 710 are illustrated in FIG. 8.

As illustrated, if there is a cache hit, data is not written to the SPAM execution register file 820 because SPAM execution register file 820 is not used during normal mode. But if there is a cache miss, the valid bits and the trash bits of the SPAM execution register file 820 are cleared. The valid bit and trash bit of the register R1S of the SPAM execution register file 820, however, are set. The content of register R1S is labeled "trash" to indicate that the register contains arbitrary data dependent on the data cache miss.

Operations of the SPAM execution register file 820 in response to the add instruction 720 are shown in FIG. 9A. Assuming that a cache miss occurred in response to the load instruction 710, the register R1 S contains arbitrary data. Because no data has been stored in register R3S, the normal mode register R3 is read. The content of normal mode register R3 is then added to the arbitrary data, and the sum is written to the SPAM register R3S. Because the sum is computed based on arbitrary data, the sum itself is considered arbitrary. Therefore, the valid bit and trash bit of the SPAM register R3S are set.

Operations of the SPAM execution register file 820 in response to another add instruction 730 are shown in FIG. 9B. In response to the add instruction 730, the processor checks whether the SPAM registers R2S and R4S contain data. As shown, SPAM registers R2S and R4S are empty before add instruction 730 is executed. Thus, the processor adds the contents of normal mode registers R2 and R4, and stores the sum in the SPAM register R2S. Because the sum is computed based on contents of the normal mode registers R2 and R4, the sum is not considered arbitrary. Thus, the trash bit of SPAM register R2S remains clear.

Figure 10:
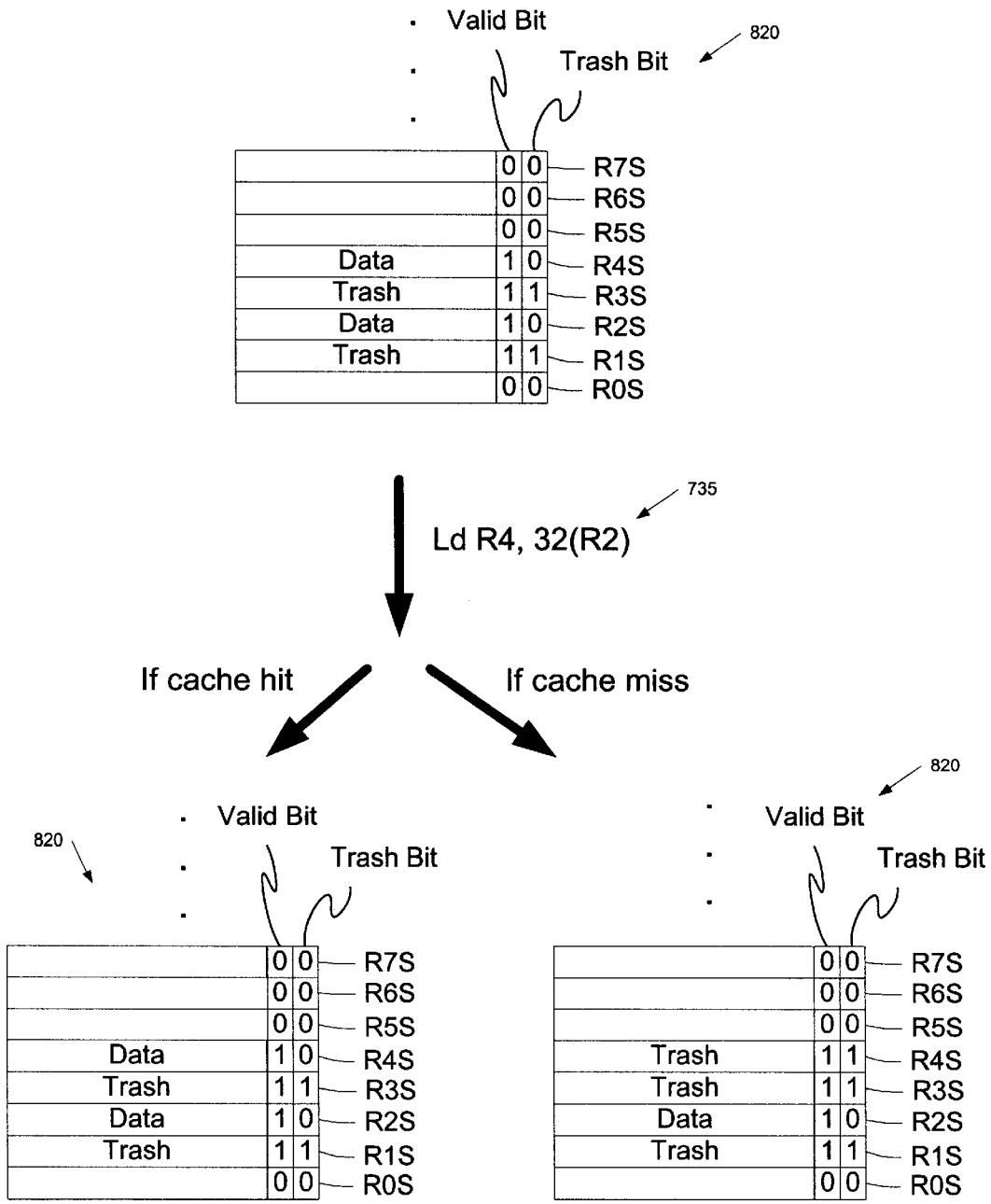
FIG. 10 illustrates operations of a SPAM execution register file in response to another load instruction of FIG. 7.

Operations of the SPAM execution register file 820 in response to the load instruction 735 are shown in FIG. 10. In response to the load instruction 735, if there is a cache hit, data retrieved from the cache memory will be stored in the SPAM register R4S, and valid bit of the SPAM register R4S will be set. If there is a cache miss, another cache fill request is issued, and the valid bit and the trash bit of SPAM register R4S will be set to indicate that the register contains arbitrary data.

Operations of the SPAM execution register file 820 in response to the load instruction 740 are shown in FIG. 11. The load instruction 740, when executed in the normal mode, will cause the processor to retrieve the content of a memory location indicated by the register R4 and to store the retrieved data at register R5. In the present example, assuming that the load instruction 740 is executed during SPAM mode, and assuming that arbitrary data is stored within the SPAM register R4S, the base address that is computed from the register's arbitrary content may also arbitrary. Rather then loading data from an arbitrary address, the processor sets the valid bit and trash bit of the SPAM register R5S to indicate that the SPAM register R5S contains arbitrary data.

Figure 12:
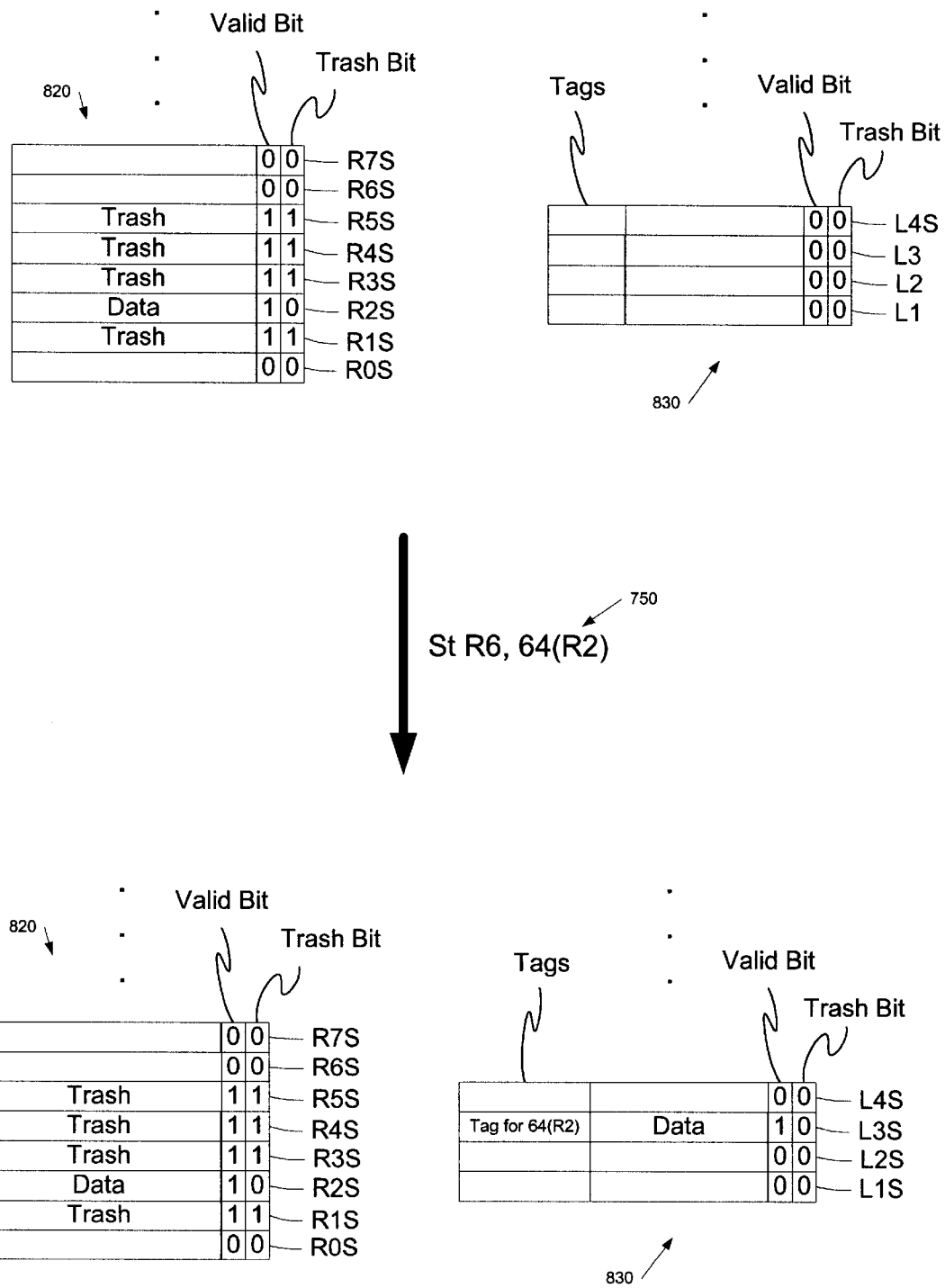
FIG. 12 illustrates operations of a SPAM execution register file and a SPAM cache memory in response to a store instruction of FIG. 7.

FIG. 12 illustrates operations of the SPAM execution register file 820 and the SPAM cache 410 in response to the store instruction 750 in SPAM mode. When executed in SPAM mode, the store instruction 750 will cause the processor to retrieve data from register R6, and to store the retrieved data in the SPAM cache 410 at cache entry L3S. A tag for the base address 64(R2) is also stored in the cache entry L3S. According to the present embodiment, store instruction 750 uses the SPAM cache to hold the data, instead of writing the normal mode data cache memory 830. This approach is adopted by the present embodiment to avoid replacing useful data already cached by the normal mode cache memory 830. This approach is also adopted to keep the data in the normal cache consistent with normal execution. For example, if a data location in the cache is used as a counter, it will be set to an incorrect value upon return to normal execution if it is incremented during SPAM execution. Furthermore, fixing such inconsistencies by flushing speculatively updated values from the data cache could cause more data cache misses than the SPAM execution would obviate by its prefetching.

Figure 13:
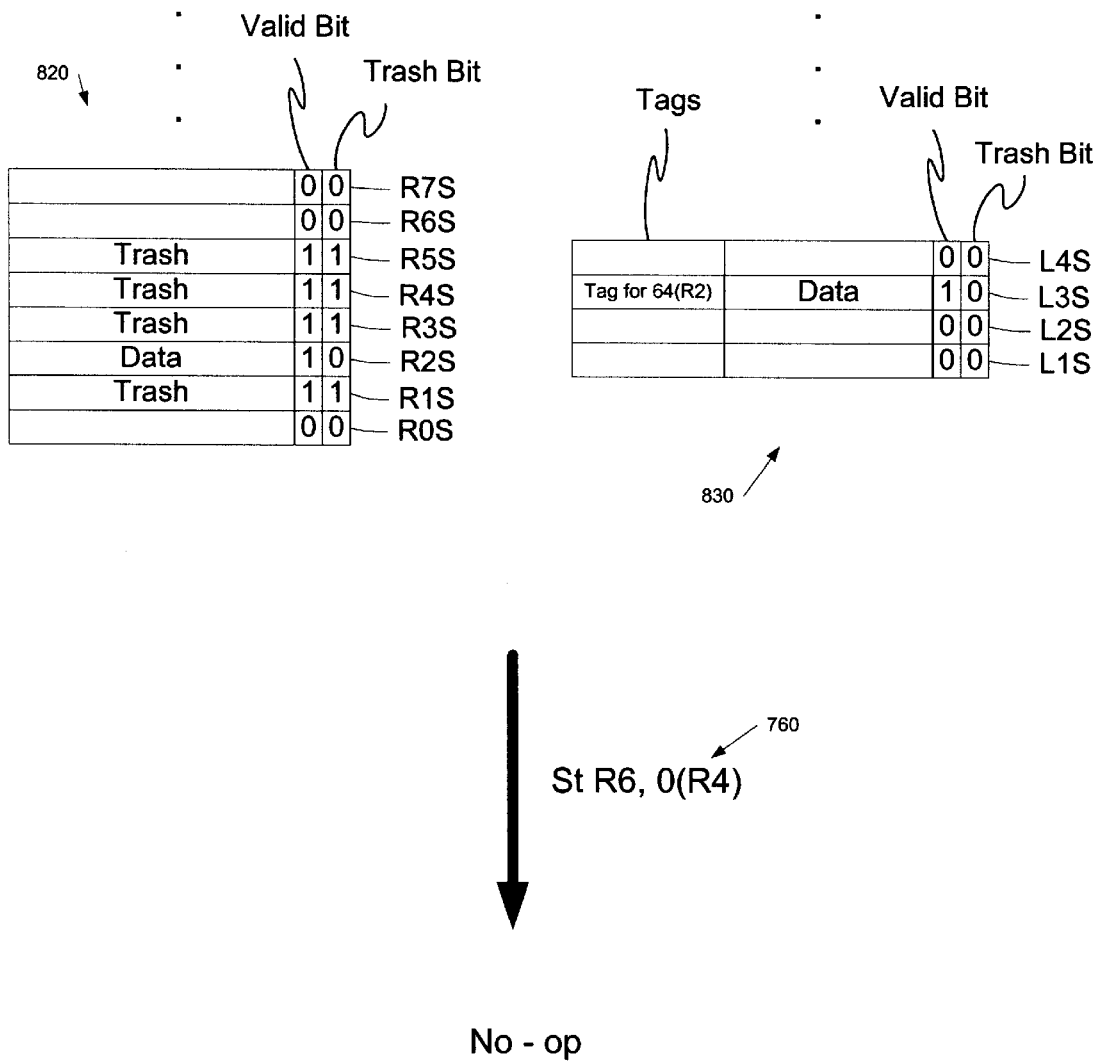
FIG. 13 illustrates operation of a SPAM execution register file and a SPAM cache memory in response to another store instruction of FIG. 7.

FIG. 13 illustrates operations of the SPAM execution register file 820 and the SPAM cache 410 in response to the store instruction 760 in SPAM mode. The store instruction 760, when executed in the normal mode, may cause data to be retrieved from a normal mode register, and will cause the retrieved data to be stored in the normal mode cache memory 830. But execution of the store instruction 760 in SPAM mode is quite different. Particularly, when the base address of a store operation contains arbitrary data, the store operation is treated as a "no-op" instruction. As illustrated in FIG. 13, the SPAM register R4S, from which the base address is retrieved, contains arbitrary data. Thus, the store instruction 760 is treated as a no-op in FIG. 13.

Figure 14:
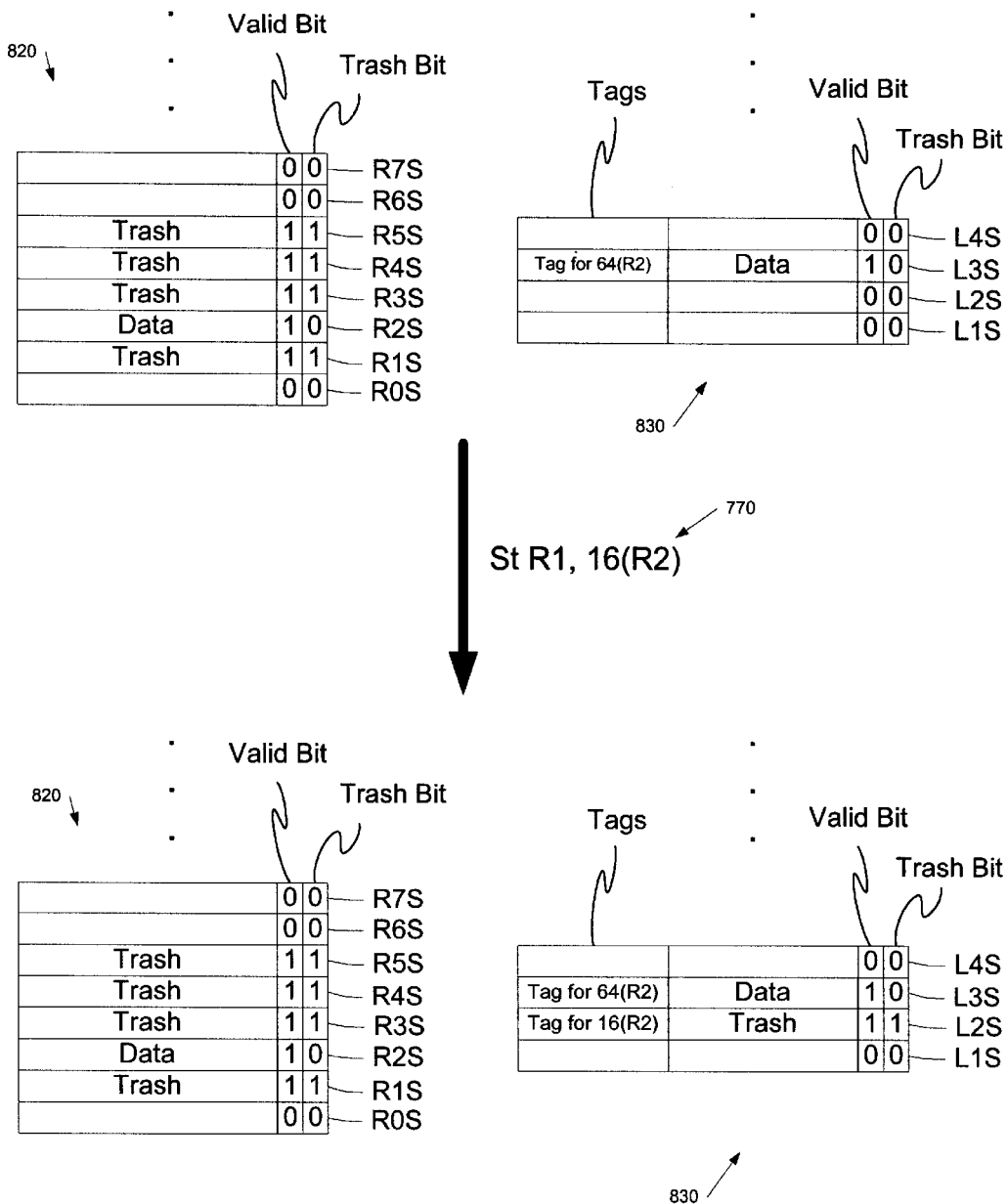
FIG. 14 illustrates operations of a SPAM execution register file and a SPAM cache memory in response to yet another store instruction of FIG. 7.

The operations of the SPAM execution register file 820 and the SPAM cache 830 in response to another store instruction 770 are illustrated in FIG. 14. As shown in FIG. 14, the source operand is the content of the SPAM register R1S, and the destination is the memory location as indicated by the content of SPAM register R2S plus sixteen. As shown, the base address is not arbitrary because the SPAM register R2S does not contain arbitrary data. The source operand, however, is arbitrary because the content of the SPAM register R1S is dependent on the initiating cache miss. Therefore, a tag associated with the base address 16(R2) is stored in cache entry L2S, and a valid bit and a trash bit of the cache entry LS2 are set.

Figure 15:
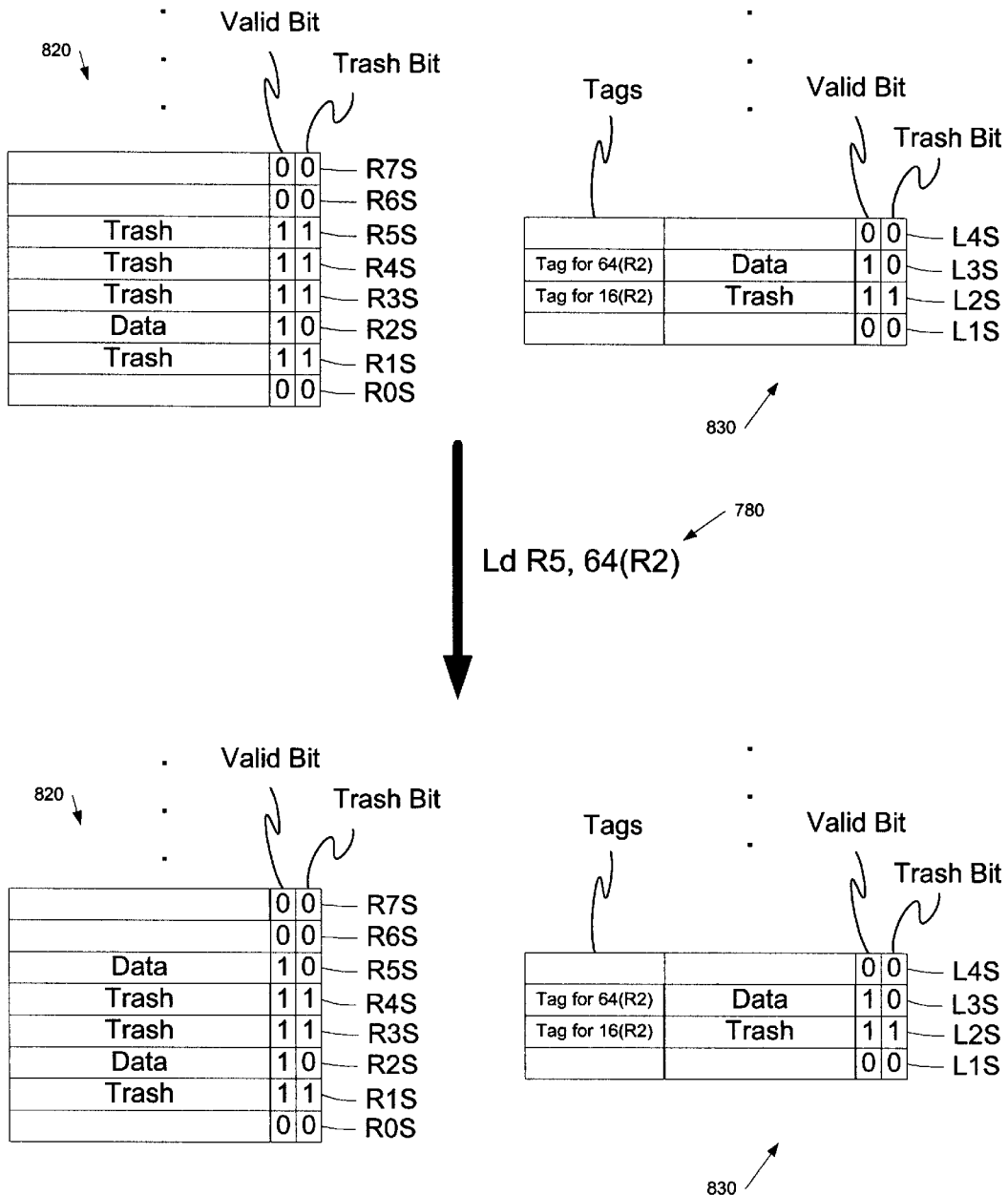
FIG. 15 illustrates operations of a SPAM execution register file and a SPAM cache memory in response to yet another load instruction of FIG. 7.

FIG. 15 is a block diagram illustrating operations of the load instruction 780 during SPAM mode. As shown in FIG. 15, before the load instruction 780 is executed, SPAM registers R1S, R3S, R4S, and R5S contain arbitrary data. Cache entries L2S of SPAM cache 830 contains arbitrary data for memory location 16(R2) and cache entry L3S contains data for memory location 64(R2). In response to the load instruction 780, the cache entry L3S is read and the contents of the cache entry L3S are stored in SPAM register R5S. The cache entry L3S contains non-arbitrary data. Thus, the trash bit of SPAM register R5S is cleared.

Figure 16:
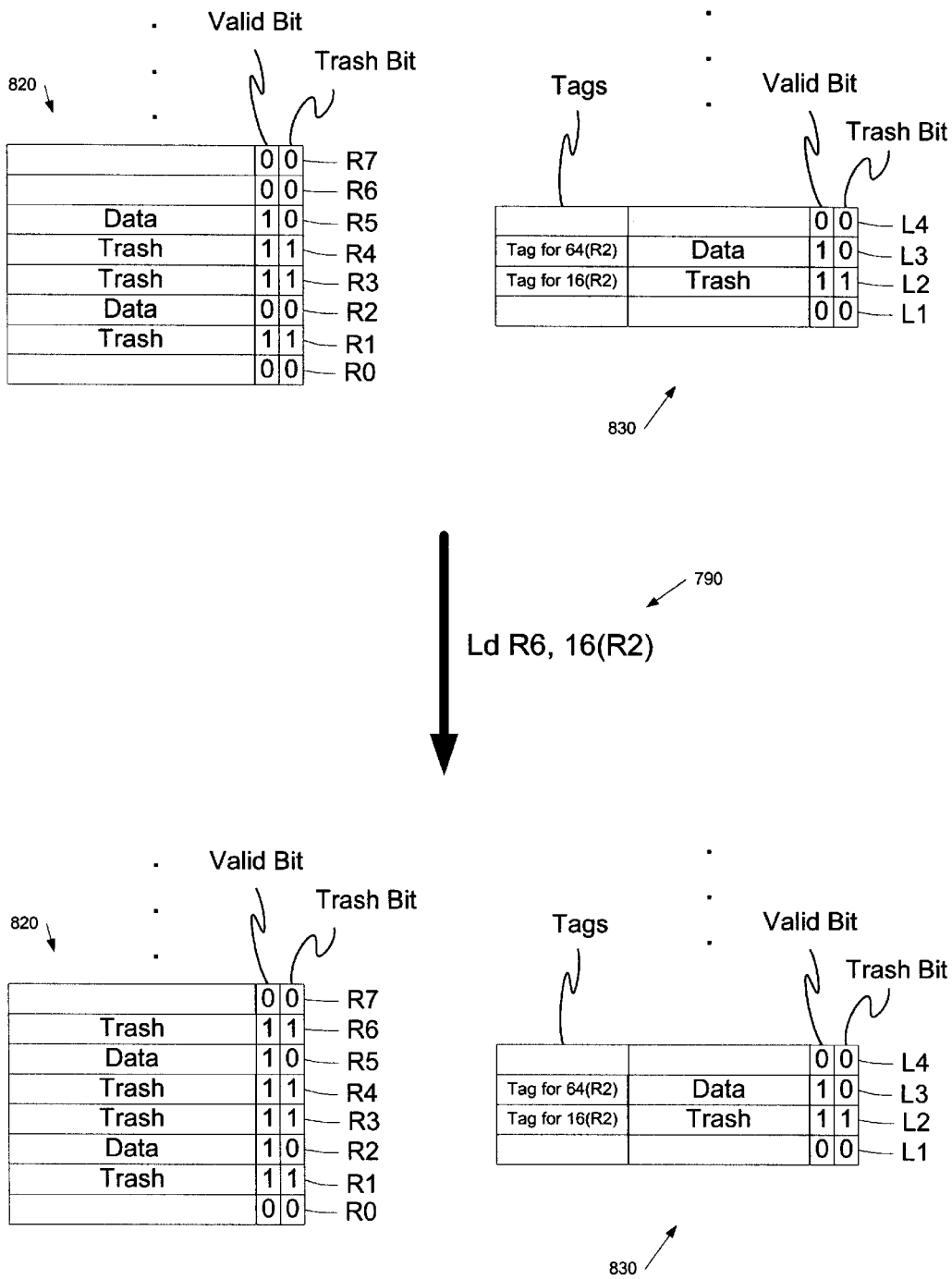
FIG. 16 illustrates operations of a SPAM execution register file and a SPAM cache memory in response to another load instruction of FIG. 7.

FIG. 16 is a block diagram illustrating operations of the load instruction 790 during SPAM mode. As shown in FIG. 16, before the load instruction 790 is executed, SPAM registers R1S, R3S, and R4S contain arbitrary data. Cache entry L2S of SPAM cache 830 contains arbitrary data for memory location 1 6(R2). In response to the load instruction 790, the content of cache entry L2S is read and the content of the cache entry L2S is stored in SPAM register R6S. Since the content of the cache entry L2S is considered arbitrary, the trash bit of the SPAM register R6S is set. The valid bit of the SPAM register R6S is also set such that data is read from the SPAM register R6S and not from the corresponding normal mode register R6 during SPAM mode.

F. Alternate Embodiments

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A processor having a normal mode and a speculative prefetching mode, the processor operable in the speculative prefetching mode after a data cache miss, comprising:
   a first data cache for storing data when the processor operates in the normal mode;
   a second data cache for storing data in response to a store instruction when the processor operates in the speculative prefetching mode, comprising:
      an entry for storing data; and
      a trash bit associated with the entry, wherein the trash bit indicates whether the entry contains arbitrary data; and
   a control logic for setting the trash bit of the second data cache when a source operand for the store instruction depends on the data cache miss.

2. The processor of claim 1, wherein the second data cache further comprises a valid bit associated with the entry, the valid bit for indicating whether the entry is in use during the speculative prefetching mode.

3. The processor of claim 2, further comprising control logic operable for reading data from the entry of the second data cache in response to a load instruction provided the valid bit is set, the control logic operable for reading data from the first data cache in response to the load instruction provided the valid bit is clear.

4. A processor having a normal mode and a speculative prefetching mode, the processor operable in the speculative prefetching mode after a data cache miss, comprising:
   a first data cache for storing data when the processor operates in the normal mode;
   a second data cache for storing data in response to a store instruction when the processor operates in the speculative prefetching mode;
   a first register for storing data when the processor operates in the normal mode;
   a second register for storing data in response to a load instruction when the processor operates in the speculative prefetching mode, the second register further having a trash bit for indicating whether the second register contains arbitrary data; and
   control logic for setting the trash bit of the second register when a source operand for the load instruction depends on the data cache miss.

5. The processor of claim 4, wherein the first register and the second register are located in separate register files of the processor.

6. The processor of claim 4, wherein the second register comprises a valid bit for indicating whether the second register contains data.

7. The processor of claim 6, further comprising control logic operable for reading data from the second register in response to an instruction provided the valid bit is set, the control logic operable for reading data from the first register in response to the instruction provided the valid bit is clear.

8. A processor having a normal mode and a speculative prefetching mode, the processor operable in the speculative prefetching mode after a data cache miss, comprising:
   a first register for storing data during the normal mode;
   a second register for storing data during the speculative prefetching mode, the second register comprising a first trash bit that indicates whether the second register contains arbitrary data;

an instruction bus for receiving a stream of instructions including a first instruction and a second instruction;

control logic for executing the first instruction;

control logic for initiating a cache fill request provided execution of the first instruction encounters a data cache miss;

control logic for setting the trash bit of the second register in response to the first instruction and the data cache miss;

control logic for executing the second instruction in the speculative prefetching mode using the second register in place of the first register;

a first data cache for storing data during the normal mode; and a second data cache for storing data in response to a store instruction during the speculative prefetching mode, wherein the second data cache comprises:

an entry for storing data; and a second trash bit associated with the entry, the second trash bit for indicating whether the entry contains arbitrary data; and control logic for setting the second trash bit in the second data cache when a source operand for the second instruction depends on the data cache miss.

9. The processor of claim 8, wherein the second data cache further comprises a valid bit associated with the entry, the valid bits for indicating that the entry is in use during the speculative prefetching mode.

10. The processor of claim 9, further comprising control logic for reading data from the entry of the second data cache in response to a load instruction provided the valid bit is set, and for reading data from the first data cache in response to the load instruction provided the valid bit is clear.

11. A processor having a normal mode and a speculative prefetching mode, the processor operable in the speculative prefetching mode after a data cache miss, comprising:

a first register for storing data during the normal mode;

a second register for storing data during the speculative prefetching mode, the second register comprising a first trash bit that indicates whether the second register contains arbitrary data;

an instruction bus for receiving a stream of instructions including a first instruction and a second instruction;

control logic for executing the first instruction;

control logic for initiating a cache fill request provided execution of the first instruction encounters a data cache miss;

control logic for setting the trash bit of the second register in response to the first instruction and the data cache miss;

control logic for executing the second instruction in the speculative prefetching mode using the second register in place of the first register; and control logic operable for updating a branch prediction state for a branch instruction in the speculative prefetching mode provided the branch instruction is not dependent on arbitrary data.

12. The processor of claim 11, wherein the branch prediction state is not updated for the branch instruction during the speculative prefetching mode provided the branch instruction is dependent on arbitrary data.

13. In a processor having a first cache memory for storing data in a normal mode and a second cache memory for storing data in a speculative prefetching mode, a method of performing memory accesses, comprising:

(a) receiving a first load instruction that calls for transferring a first data into a first register;

(b) determining whether the first data is present in the first data cache;

(c) provided the first data is missing from the first data cache, initiating a first cache fill request to retrieve the first data from an external memory, copying a first program counter to a second program counter, and writing an arbitrary data into a special register such that program execution continues with the second program counter and the arbitrary data;

(d) before the first cache fill request is completed, receiving a second load instruction that calls for transferring a second data into a second register, and determining whether the second data is present in the first data cache and the second data cache;

(e) provided the second data is missing from the first data cache and the second data cache, initiating a second cache fill request to retrieve the second data from an external memory;

(f) after the first cache fill request is completed, resuming program execution using the first program counter and ignoring the arbitrary data stored in the second register and in the second cache memory; and (g) re-executing the second load instruction, wherein retrieval time of the second data is reduced as the second cache fill request has been previously initiated.

14. The method of claim 13, further comprising:

before the first cache fill request is completed, receiving a store instruction that calls for transferring the first data from the first register to an external memory; and in response to the store instruction, transferring the arbitrary data from the special register to the second cache memory.

* * * * *